United States Patent
Mueller et al.

(10) Patent No.: US 10,753,517 B2
(45) Date of Patent: *Aug. 25, 2020

(54) TUBULAR CONNECTING ARRANGEMENT AND METHOD OF SEALINGLY CONNECTING TUBULARS

(71) Applicants: Stephan Mueller, Hannover (DE); Andreas Herbel, Hannover (DE); Carsten Haubold, Celle (DE)

(72) Inventors: Stephan Mueller, Hannover (DE); Andreas Herbel, Hannover (DE); Carsten Haubold, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/052,296

(22) Filed: Aug. 1, 2018

(65) Prior Publication Data
US 2018/0340636 A1 Nov. 29, 2018

Related U.S. Application Data

(63) Continuation of application No. 14/271,688, filed on May 7, 2014, now Pat. No. 10,066,768.

(51) Int. Cl.
*F16L 15/02* (2006.01)
*F16L 15/04* (2006.01)
(Continued)

(52) U.S. Cl.
CPC ............ *F16L 15/04* (2013.01); *F16L 15/008* (2013.01); *F16L 15/02* (2013.01); *F16L 15/08* (2013.01);
(Continued)

(58) Field of Classification Search
CPC . F16L 2201/40; F16L 2201/20; F16L 21/002; F16L 57/005; F16L 15/02; F16L 15/008; F16L 15/08; F16L 15/04
See application file for complete search history.

(56) References Cited

U.S. PATENT DOCUMENTS

| 236,957 A | 1/1881 | Ott et al. |
| 1,859,311 A * | 5/1932 | McEvoy, Jr. ......... E21B 17/042 |
| | | 285/53 |

(Continued)

FOREIGN PATENT DOCUMENTS

| DE | 3207237 A1 | 9/1983 |
| WO | 2010122431 | 10/2010 |

OTHER PUBLICATIONS

Notification of Transmittal of the International Search Report and the Written Opinion of the International Searching Authority; PCT/US2015/029473; dated Aug. 13, 2015; 10 pages.
(Continued)

*Primary Examiner* — David Bochna
*Assistant Examiner* — James A Linford
(74) *Attorney, Agent, or Firm* — Cantor Colburn LLP

(57) ABSTRACT

A tubular connecting arrangement includes, a first tubular having a first shoulder and first threads, a second tubular having a second shoulder and second threads, a seal sealingly engagable to both the first shoulder and the second shoulder, an insert and a sleeve. The insert is attachable to the second tubular and configured to provide radial support to the second tubular. The sleeve threadably engagable with both the first threads and the second threads in response to being rotated in a same direction relative to both the first tubular and the second tubular such that the first shoulder and the second shoulder are moved toward one another to
(Continued)

compress the seal therebetween without rotational movement of the first tubular relative to the second tubular.

21 Claims, 4 Drawing Sheets

(51) Int. Cl.
- *F16L 21/00* (2006.01)
- *F16L 57/00* (2006.01)
- *F16L 15/00* (2006.01)
- *F16L 15/08* (2006.01)
- *F16L 17/08* (2006.01)

(52) U.S. Cl.
CPC ............ *F16L 17/08* (2013.01); *F16L 21/002* (2013.01); *F16L 57/005* (2013.01); *F16L 2201/20* (2013.01); *F16L 2201/40* (2013.01)

(56) References Cited

U.S. PATENT DOCUMENTS

| | | | |
|---|---|---|---|
| 2,509,363 A * | 5/1950 | Page | F16L 15/04 285/109 |
| 3,476,409 A | 11/1969 | Benteler et al. | |
| 3,479,059 A | 11/1969 | Taylor et al. | |
| 3,581,834 A | 6/1971 | Kellner et al. | |
| 3,672,705 A | 6/1972 | Rush | |
| 3,850,461 A | 11/1974 | Fujioka et al. | |
| 4,060,264 A | 11/1977 | Gajajiva | |
| 4,434,863 A | 3/1984 | Garrett | |
| 4,690,436 A | 9/1987 | Hehl | |
| 4,694,859 A | 9/1987 | Smith, III | |
| 4,706,997 A | 11/1987 | Carstensen | |
| 5,104,151 A | 4/1992 | Adams | |
| 5,415,442 A | 5/1995 | Klementich | |
| 5,794,985 A | 8/1998 | Mallis | |
| 6,070,912 A | 6/2000 | Latham | |
| 6,425,829 B1 | 7/2002 | Julien | |
| 6,604,761 B1 | 8/2003 | Debalme et al. | |
| 6,666,275 B2 | 12/2003 | Neal et al. | |
| 7,431,351 B2 | 10/2008 | Russell | |
| 7,510,219 B2 | 3/2009 | Huston | |
| 8,439,404 B2 | 5/2013 | Anton et al. | |
| 2001/0029990 A1 | 10/2001 | Takahashi et al. | |
| 2001/0030076 A1 | 10/2001 | Paulsson | |
| 2005/0242583 A1 * | 11/2005 | Geary | E21B 17/042 285/333 |
| 2006/0152000 A1 | 7/2006 | Delange et al. | |
| 2006/0267342 A1 | 11/2006 | Boyd | |
| 2007/0063513 A1 | 3/2007 | Boyd | |
| 2008/0309069 A1 | 12/2008 | Breziat et al. | |
| 2010/0230114 A1 | 9/2010 | Jennings et al. | |
| 2011/0203790 A1 | 8/2011 | Carstensen | |
| 2015/0323108 A1 | 11/2015 | Mueller et al. | |

OTHER PUBLICATIONS

PlumbingSupply.com, Nov. 3, 2012, [online], [retrieved on Nov. 24, 2017], Retreived from the internet;, URL: https://web.archive.org/web/20121103024320/https:/www.plumbingsupply.com/eftrigh.html.; 5 pages.

Tubular Services Catalog; Baker Hughes Incorporated; 2011; Retrieved Dec. 5, 2013 at: http://7b0211abc212ce1aa79f-7f5cb6763e48b5a876d4f2b22c1c7b26.r90.cf2.rackcdn.com/v1/fab8fc0302771badfd4b9ef60f8968ac/31236-Tubular-Services-Catalog.1212_LoRes.pdf.

* cited by examiner

TUBULAR CONNECTING ARRANGEMENT AND METHOD OF SEALINGLY CONNECTING TUBULARS

CROSS REFERENCE TO RELATED APPLICATIONS

This application is a continuation of U.S. application Ser. No. 14/271,688 filed May 7, 2014, the disclosure of which is incorporated by reference herein in its entirety.

BACKGROUND

Many shapes and configurations of seals exist for sealing objects to one another. Polymeric o-rings are one of the most common types of seals used. Such seals work well for the purpose for which they were designed. Some applications however require seals that are more robust and need to be able to seal under high temperatures and/or high pressures. The carbon dioxide sequestration, power plants and hydrocarbon recovery industries are two industries where severe sealing conditions may exist. Seals made of metal are sometimes used in applications wherein the severe conditions are anticipated. Metal seals have certain limitations that need to be considered to assure sufficient sealing is obtained. One example is that little or no relative movement is allowed between the metal seal and one or more of the surfaces the seal is to be sealed against. This limitation is to avoid abrasion of a surface of the seal that if allowed to occur could detrimentally affect the sealing performance thereof. Designs and methods of employing seals to avoid such degradation of the seal itself are of interest to those who practice in such industries.

BRIEF DESCRIPTION

Disclosed herein is a tubular connecting arrangement. The arrangement includes, a first tubular having a first shoulder and first threads, a second tubular having a second shoulder and second threads, a seal sealingly engagable to both the first shoulder and the second shoulder, an insert and a sleeve. The insert is attachable to the second tubular and configured to provide radial support to the second tubular. The sleeve threadably engagable with both the first threads and the second threads in response to being rotated in a same direction relative to both the first tubular and the second tubular such that the first shoulder and the second shoulder are moved toward one another to compress the seal therebetween without rotational movement of the first tubular relative to the second tubular.

Further disclosed herein is a method of sealingly connecting tubulars. The method includes, rotating a sleeve threadably engaged with both a first tubular and a second tubular, attaching an insert within the second tubular, sealingly compressing a seal between a first shoulder on the first tubular and a second shoulder on the second tubular without relative rotation between the first tubular and the second tubular, and radially supporting the second tubular with the insert.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
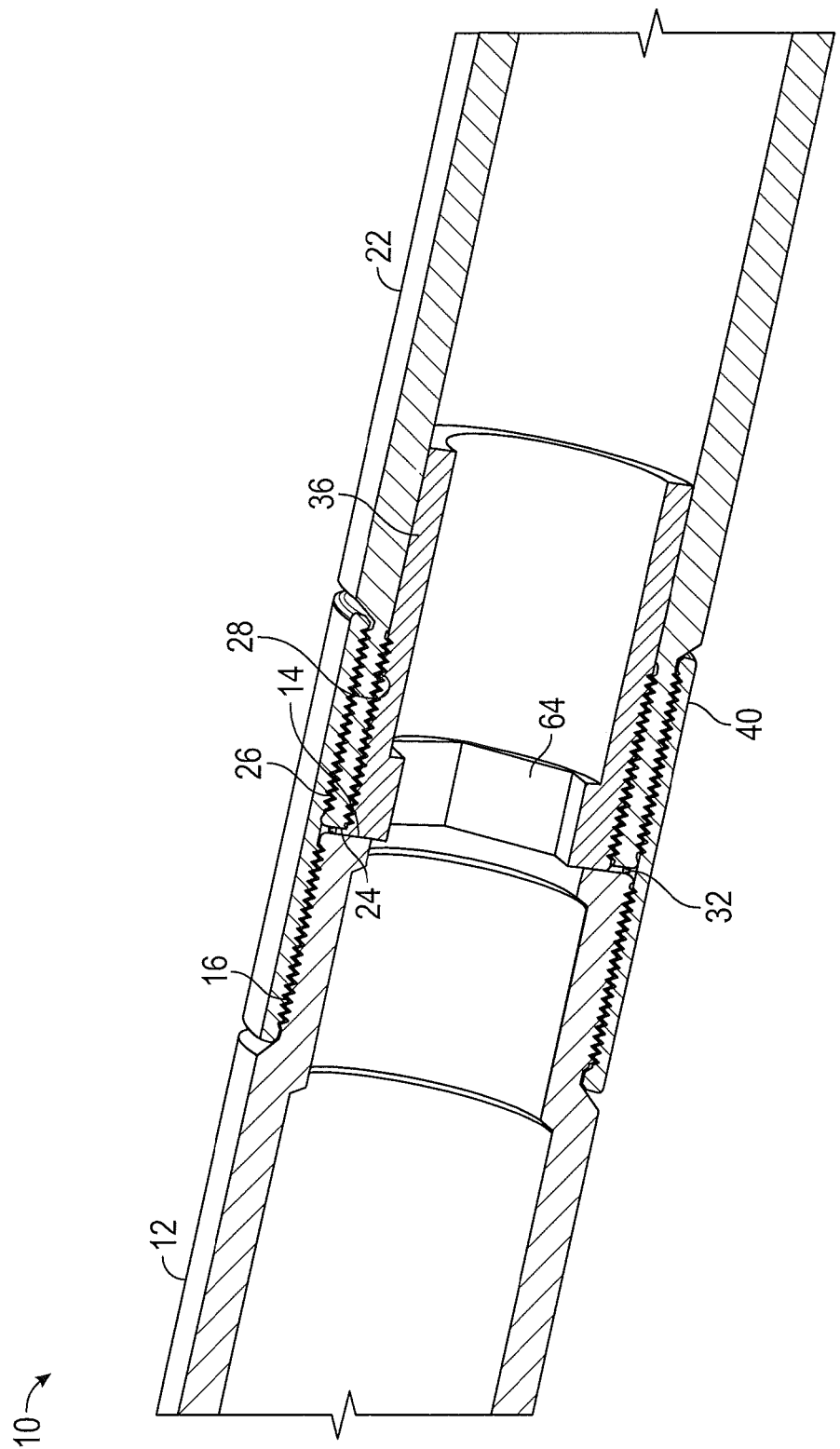
FIG. 1 depicts a perspective cross sectional view of a tubular connecting arrangement disclosed herein.
Figure 2:
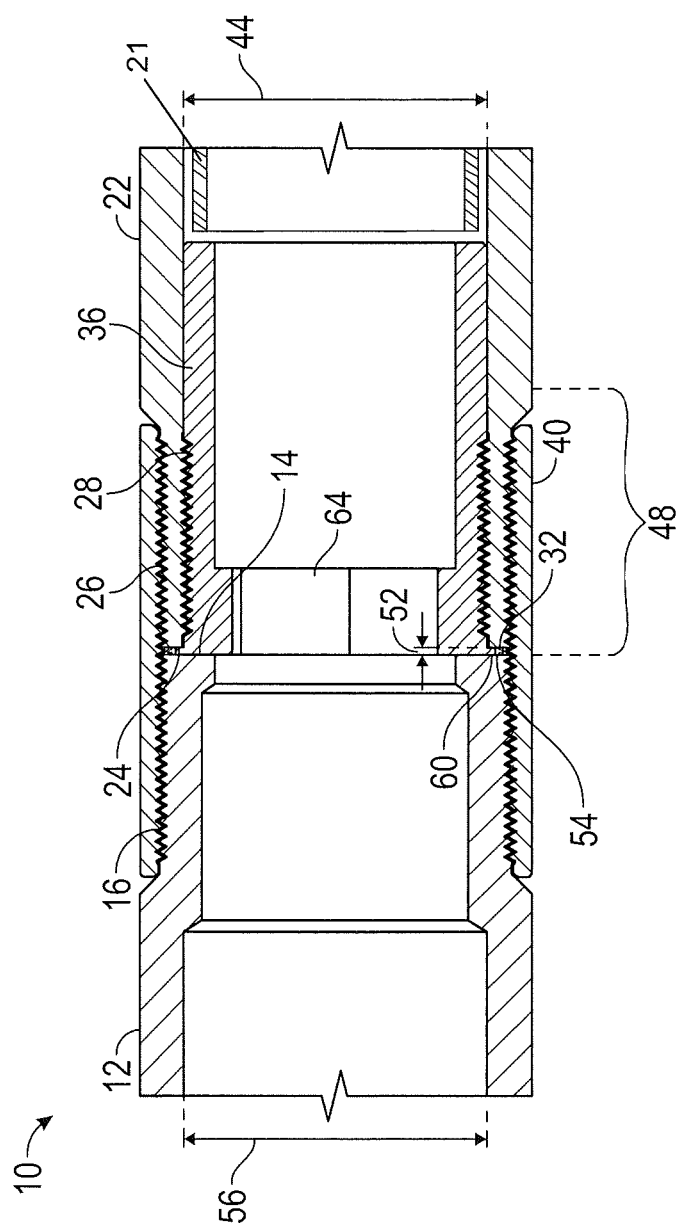
FIG. 2 depicts a magnified cross sectional view of the tubular connecting arrangement of FIG. 1.

Referring to FIGS. 1 and 2 a tubular connecting arrangement disclosed herein is illustrated generally at 10. The tubular connecting arrangement 10 includes a first tubular 12 having a first shoulder 14 and first threads 16 and a second tubular 22 having a second shoulder 24, second threads 26 and third threads 28. A seal 32 is sealingly engagable with both the first shoulder 14 and the second shoulder 24. And an insert 36 is threadably engagable with the third threads 28 and configured to provide at least radial support to the second tubular 22. A sleeve 40 is threadably engagable with both the first threads 16 and the second threads 26 in response to being rotated in a same direction relative to both the first tubular 12 and the second tubular 22. This threadable engagement causes the first shoulder 14 and the second shoulder 24 to move toward one another and compress the seal 32 therebetween without requiring the first tubular 12 to rotate relative to the second tubular 22.

The foregoing structure allows the second tubular 22 to have a minimum inner radial dimension 44 that is larger further from an end portion 48 than nearer to the end portion 48 while still maintaining enough wall thickness of the second tubular 22 near the end portion 48. This is because the insert 36 provides structural radial and axial support to the end portion 48 of the second tubular 22 that is needed to prevent damage to the end portion 48 that could occur due to high loads transmitted thereto from the first tubular 12 and imparted thereto from pressure surrounding the second tubular 22. (Of course an alternative approach would be to just make the wall thickness of the second tubular 22 thicker throughout its full length. Doing so however would result in any tool being installed inside the second tubular 22 having a smaller inner radial dimension than that of the second tubular 22, which is a condition the use of the insert 36 avoids.) The loads from the first tubular 12 include axially compressive and axially tensive loads due to bending forces applied across the tubular connecting arrangement 10. These axial loads could result in leakage past the seal 32 due to changes in a gap dimension 52 (defined between the two shoulders 14 and 24) and subsequent changes in compression of the seal 32 outside of a desired compression range. Such changes in the compressive loading of the end portion 48 of the second tubular 22 could occur if the insert 36 were not present. Additionally, the insert 36 may include a third shoulder 54 that contacts the first shoulder 14 thereby supporting at least some of the axial load from the first tubular 12 directly. The insert 36 allows the minimum inner radial dimension 44 to be as large as a minimum inner radial dimension 56 of the first tubular 12 in areas other than near where the first threads 16 are located. As such, tools 21 such as sensor probes, for example, that are generally tubular shaped can be installed into the second tubular 22 prior to engaging the insert 36 into the second tubular 22. The tools could have an outer radial dimension that substantially matches the minimum radial dimension 44 and inner radial dimensions that match those of the insert 36.

Although the insert 36 is attached to the second tubular 22 in the embodiment of FIGS. 1 and 2, alternate embodiments may instead attach an insert to a second tubular via welding, bonding, clamping, soldering and combinations of the foregoing.

In the embodiment of FIGS. 1 and 2, the insert 36 includes an optional flange 60 that extends radially outwardly from the rest of the insert 36 and abuts the second shoulder 24 when the insert 36 is fully threadably engaged with the second tubular 22. The flange 60 in this embodiment acts as a stop for the threadable engagement of the insert 36 to the second tubular 22. The flange 60 can also help prevent a gap dimension 60 between the shoulders 14, 24 from decreasing below a desired minimum dimension. For embodiments without the flange 60 the insert 36 can be configured to bottom out with the second threads 26 at a location such that the third shoulder 54 is positioned at the desired location relative to the second tubular 22.

The insert 36 in the illustrated embodiment also includes an optional noncircular inner portion 64. The inner portion 64 is receptive to a tool (not shown) for applying torque to the insert 36 when threadably engaging the insert 36 into the second tubular 22. Although the inner portion 64 of the embodiment shown is hexagonal, any noncircular shape including, a square, triangular, pentagonal, oval, star shaped, and octagonal, for example, would suffice.

Figure 3:
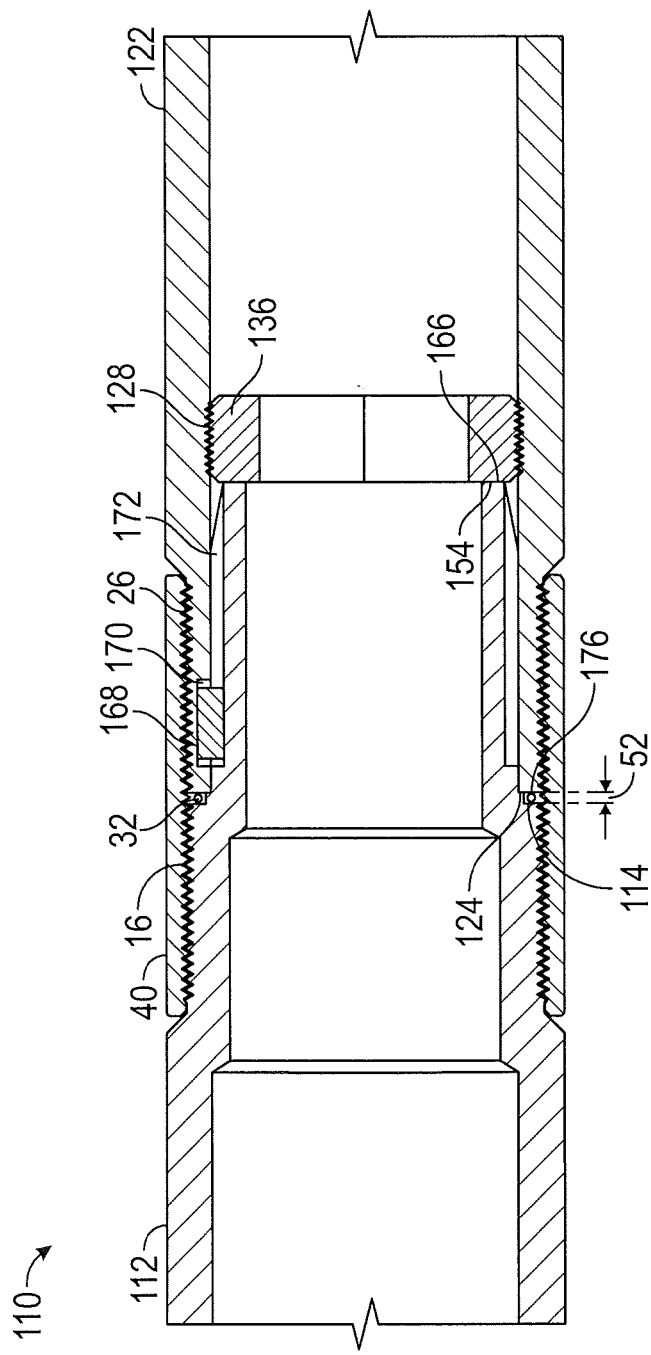
FIG. 3 depicts a cross sectional view of an alternative embodiment of a tubular connecting arrangement disclosed herein.

Referring to FIG. 3 an alternate embodiment of a tubular connecting arrangement disclosed herein is illustrated at 110. Components in the arrangement 110 that are similar to components of the arrangement 10 are designated with the same reference characters and are not described again hereunder. An insert 136 of the arrangement 110 is threadably engaged within third threads 128 to a position deeper within a second tubular 122 than that of the arrangement 10. A third shoulder 154 on the insert 136 is abutted by a fourth shoulder 166 of a first tubular 112 to help carry loads between the first tubular 112 and the second tubular 122.

An optional key 168 positioned within a recess 170 in the second tubular 122 engages a slot 172 in the first tubular 112 to prevent relative rotation between the tubulars 112, 122 while the sleeve 40 is being threadably engaged with the first threads 16 and the second threads 26. Alternatively tools could be positioned externally to the tubulars 112, 122 to prevent their relative rotation while the sleeve 40 is being threadably engaged therewith. An optional fifth shoulder 176 on the either or both of the first tubular 112 or the second tubular 122 (shown in this embodiment on only the first tubular 112) contacts a shoulder 114, 124 on the other of the first tubular 112 or the second tubular 122 to help support axially loads between the tubulars 112, 122 and to maintain the gap dimension 52 needed for the seal 32 to maintain sealing integrity.

Figure 4:
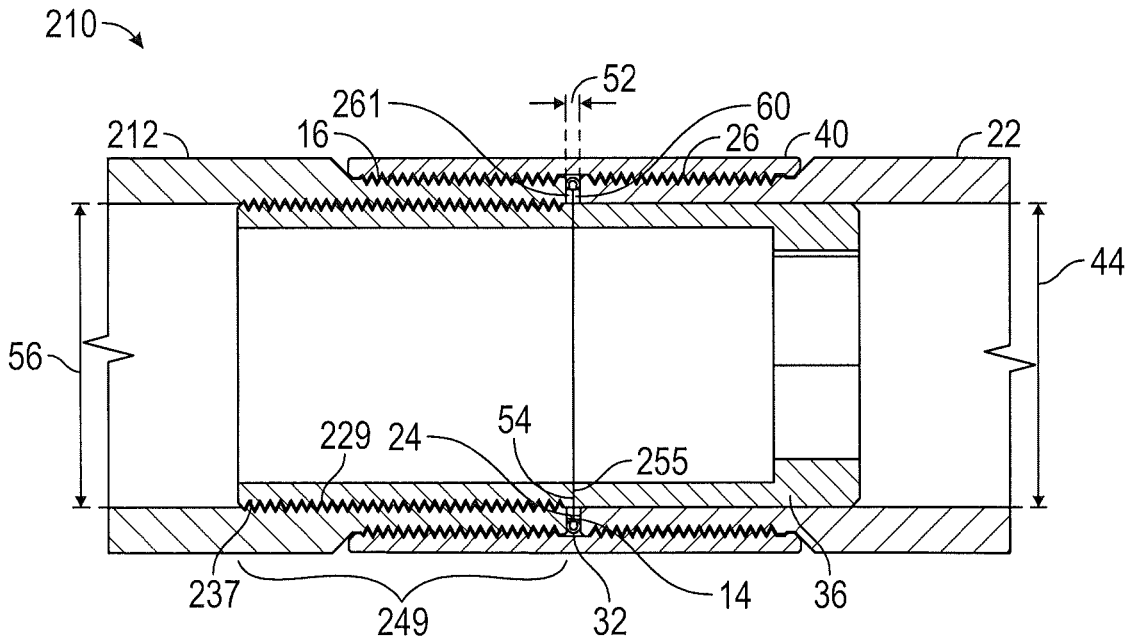
FIG. 4 depicts a cross sectional view of another alternative embodiment of a tubular connecting arrangement.

Referring to FIG. 4 an alternate embodiment of a tubular connecting arrangement disclosed herein is illustrated at 210. Components in the arrangement 210 that are similar to components of the arrangement 10 are designated with the same reference characters and are not described again hereunder. A collar 237 of the arrangement 210 is threadably engaged within fourth threads 229 in a first tubular 212. A sixth shoulder 255 on the collar 237 abuts the third shoulder 54 on the insert 36 to help carry loads between the first tubular 212 and the second tubular 22. An optional flange 261 of the collar 237 and the flange 60 of the insert 36 together define and help maintain the gap dimension 52 and sealing integrity of the seal 32 to the first shoulder 14 and the second shoulder 24. The foregoing structure allows the minimum radial dimension 56 of the first tubular 212 to continue through an end portion 249 of the first tubular 212. This allows for tools such as sensor probes to be installed within the first tubular 212 as well as within the second tubular 22 without having to reduce radial dimensions thereof below those of the minimum radial dimensions 44 and 56 to do so.

Figure 5:
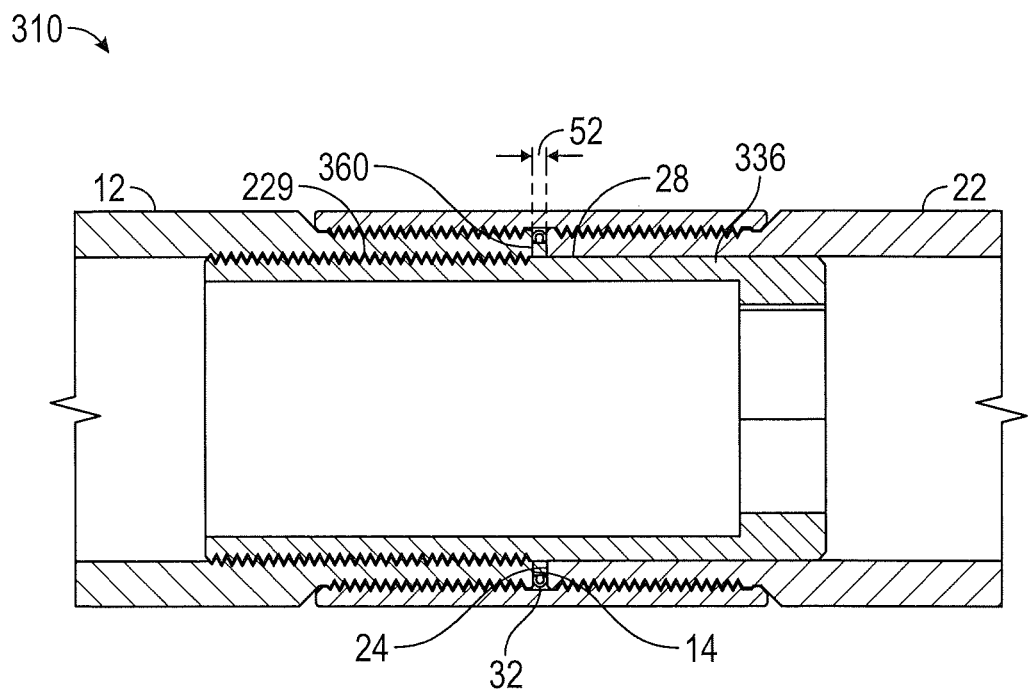
FIG. 5 depicts a cross sectional view another alternative embodiment of a tubular connecting arrangement.

Referring to FIG. 5 an alternate embodiment of a tubular connecting arrangement disclosed herein is illustrated at 310. The arrangement 310 is similar to the arrangement 10 with the major difference being that an insert 336 of the arrangement 310 is threadably engaged within both the third threads 28 of the second tubular 22 and the fourth threads 229 of the first tubular 12. The insert 336 includes a flange 360 that defines and helps maintain the gap dimension 52 and sealing integrity of the seal 32 to the first shoulder 14 and the second shoulder 24.

The seal 32 is employed in the embodiments illustrated is "C" shaped and is made of metal, although other embodiment may employ seals made of polymers, elastomers and other materials. Also seals with cross sectional shapes other than "C" shaped may also be employed in embodiments. For embodiments with the seal 32 being made of metal at least one of the seal 32, the first shoulder 14 and the second 24 may be plated with a coating of gold, silver, copper or PTFE. Further at least one of the seal 32, the first shoulder 14 and the second 24 may have a surface roughness of less than about Ra 1.6. Since metals tend to have higher temperature tolerance than other materials making the seal 32 out of metal may increase temperature as well as pressures at which the arrangements 10, 110, 210, 310 may be used. Metals, however, tend to have less tolerance for variation in levels of compression range over which they may maintain a seal. Embodiments disclosed herein allow for maintaining tight tolerances on compressive loading of the seal 32. Additionally, embodiments disclosed herein prevent relative rotational motion between the seal 32 and the shoulders 14, 24 to which it seals to minimize potential damage to the shoulders 14, 24, the seal 32 and any surface coatings or treatments to surfaces of these.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A tubular connecting arrangement comprising:
a first tubular having a first shoulder and first threads;
a second tubular having a second shoulder and second threads, the second tubular having a minimum inner radial dimension and configured to accept a tool having an outer radial dimension that fits within the minimum inner radial dimension of the second tubular;
a seal sealingly engagable to both the first shoulder and the second shoulder;
an insert being attachable to the second tubular and configured to provide radial support to the second tubular and having an inside dimension smaller than the outer radial dimension of the tool perpendicular to the length axis of the second tubular; and
a sleeve threadably engagable with both the first threads and the second threads in response to being rotated in a same direction relative to both the first tubular and the second tubular such that the first shoulder and the second shoulder are moved toward one another to compress the seal therebetween wherein neither the first nor second tubular rotates independently of the other of the first or second tubular during the rotation of the sleeve, the arrangement being configured to maintain a selected minimum gap dimension for the seal between the first shoulder and the second shoulder.

2. The tubular connecting arrangement of claim 1, wherein the first tubular includes a third shoulder configured to abut the insert to support axially compressive loads between the first tubular and the second tubular.

3. The tubular connecting arrangement of claim 2, wherein threadable engagement between the insert and the second tubular is configured to bottom out such that the third shoulder is at a selected position relative to the second shoulder.

4. The tubular connecting arrangement of claim 1, wherein a minimum inner radial dimension of the second tubular is greater than a minimum inner radial dimension of the insert.

5. The tubular connecting arrangement of claim 1, wherein the insert has a noncircular inner surface receptive to a tool to allow torque to be applied to the insert by the tool.

6. The tubular connecting arrangement of claim 1, wherein the insert includes a flange that is compressed between the first shoulder and the second shoulder when the seal is sealingly engaged with the first shoulder and the second shoulder.

7. The tubular connecting arrangement of claim 1, further comprising a key engagable with both the first tubular and the second tubular such that the key prevents relative rotational motion between the first tubular and the second tubular.

8. The tubular connecting arrangement of claim 1, further comprising a collar that is threadably engagable with threads on an inside of the first tubular.

9. The tubular connecting arrangement of claim 8, wherein a minimum inner radial dimension of the first tubular is greater than a minimum inner radial dimension of the collar.

10. The tubular connecting arrangement of claim 9, wherein the minimum inner radial dimension of the first tubular is the same as the minimum inner radial dimension of the second tubular.

11. The tubular connecting arrangement of claim 1, wherein the seal is made of metal.

12. The tubular connecting arrangement of claim 11, wherein at least one of the seal, the first shoulder and the second shoulder are plated with a coating of gold, silver, copper or PTFE.

13. The tubular connecting arrangement of claim 11, wherein at least one of the seal the first shoulder and the second have a surface roughness of less than Ra 1.6.

14. The tubular connecting arrangement of claim 1, wherein the second tubular has third threads on an inside thereof of the second tubular and the insert is threadably engagable with the third threads.

15. The tubular connecting arrangement of claim 1, wherein the insert is attached to the second tubular via welding, bonding, clamping, soldering or combinations of the foregoing.

16. The tubular connecting arrangement of claim 1, wherein the arrangement is configured to maintain the seal in axial contact with the shoulders while the seal lacks radial contact with any structure.

17. A method of sealingly connecting tubulars comprising:
rotating a sleeve threadably engaged with both a first tubular and a second tubular, the first tubular having a first shoulder and first threads and the second tubular having a second shoulder and second threads, the second tubular having a minimum inner radial dimension and configured to accept a tool having an outer radial dimension that fits within the minimum inner radial dimension of the second tubular, the sleeve being rotated in a same direction relative to both the first tubular and the second tubular such that the first shoulder and the second shoulder are moved toward one another to compress a seal sealingly engagable to both the first shoulder and the second shoulder wherein neither the first nor second tubular rotates independently of the other of the first or second tubular during the rotation of the sleeve, the arrangement being configured to maintain a selected minimum gap dimension for the seal between the first shoulder and the second shoulder;
attaching an insert within the second tubular, the insert configured to provide radial support to the second tubular and having an inside dimension smaller than the outer radial dimension of the tool perpendicular to the length axis of the second tubular; and;
sealingly compressing the seal between the first shoulder on the first tubular and the second shoulder on the second tubular without relative rotation between the first tubular and the second tubular; and
radially supporting the second tubular with the insert.

18. The method of sealingly connecting tubulars of claim 17, further comprising bottoming out the threadable engagement between the insert and the second tubular.

19. The method of sealingly connecting tubulars of claim 17, further comprising abutting a third shoulder on the first tubular against the insert.

20. The method of sealingly connecting tubulars of claim 19, further comprising supporting axial compression between the first tubular and the second tubular with the abutting of the third shoulder against the insert.

21. The method of sealingly connecting tubulars of claim 17, further comprising compressing a flange of the insert between the first shoulder and the second shoulder.

* * * * *